(12) United States Patent
LaPoint

(10) Patent No.: US 11,241,072 B2
(45) Date of Patent: Feb. 8, 2022

(54) UNIVERSAL BATHROOM HOLDER

(71) Applicant: Jean LaPoint, Lowell, MA (US)

(72) Inventor: Jean LaPoint, Lowell, MA (US)

( * ) Notice: Subject to any disclaimer, the term of this patent is extended or adjusted under 35 U.S.C. 154(b) by 0 days.

(21) Appl. No.: 16/382,775

(22) Filed: Apr. 12, 2019

(65) Prior Publication Data

US 2019/0313760 A1    Oct. 17, 2019

Related U.S. Application Data

(60) Provisional application No. 62/657,155, filed on Apr. 13, 2018, provisional application No. 62/737,325, filed on Sep. 27, 2018.

(51) Int. Cl.
| | | |
|---|---|---|
| *A45D 20/12* | (2006.01) | |
| *F16M 11/08* | (2006.01) | |
| *F16M 13/02* | (2006.01) | |
| *F16M 11/12* | (2006.01) | |

(52) U.S. Cl.
CPC ............. *A45D 20/12* (2013.01); *F16M 11/08* (2013.01); *F16M 11/121* (2013.01); *F16M 13/02* (2013.01); *A45D 2020/126* (2013.01)

(58) Field of Classification Search
CPC .. A45D 20/12; A45D 2020/126; A45D 20/00; F16M 11/08; F16M 11/121; F16M 13/021
USPC ..................................................... 248/282.1
See application file for complete search history.

(56) References Cited

U.S. PATENT DOCUMENTS

| | | | | |
|---|---|---|---|---|
| 952,495 A | * | 3/1910 | Austin .................... | A47G 1/17 248/205.8 |
| 973,319 A | * | 10/1910 | Thunen et al. ............ | B62J 6/02 248/230.5 |
| 1,300,863 A | * | 4/1919 | Otte ....................... | B60Q 1/245 362/421 |
| 2,048,612 A | * | 7/1936 | Maguire ............... | A61J 9/0638 248/103 |
| 2,349,054 A | * | 5/1944 | Phipps ................. | A61J 9/0638 248/106 |
| 2,470,694 A | | 8/1947 | Sing | |

(Continued)

FOREIGN PATENT DOCUMENTS

| | | |
|---|---|---|
| CN | 208510902 U | 2/2019 |
| DE | 10206519 | 8/2003 |
| WO | 2003099059 | 12/2003 |

OTHER PUBLICATIONS

Voss Wall Mounted Hair Dryer Holder in Chrome, https://www.homedepot.com/p/MOEN-Voss-Wall-Mounted-Hair-Dryer-Holder-in-Chrome-YB5170CH/203623682.

(Continued)

*Primary Examiner* — Nkeisha Smith
(74) *Attorney, Agent, or Firm* — Lambert Shortell & Connaughton; David J. Connaughton, Jr.; Justin P. Tinger

(57) ABSTRACT

A system to hold a hair dryer or other item adjustably in position to allow a user to realize hands-free use of the item. The system is designed to make hair drying and/or the hands-free use of any other items in, for example, a bathroom setting, easier and more efficient. The item holder of the present invention is formed of an approximately vertically mounted bar, with a slider slideably connected to the bar. The slider can be loosened, moved, and tightened into position. An item can then be connected to the slider, and held in place in a position.

4 Claims, 10 Drawing Sheets

(56) References Cited

U.S. PATENT DOCUMENTS

| | | | |
|---|---|---|---|
| 2,689,995 A * | 9/1954 | Smith | B01L 9/50 |
| | | | 285/61 |
| 3,229,940 A | 1/1966 | Kagels | |
| 3,404,410 A * | 10/1968 | Sumida | E03C 1/06 |
| | | | 4/615 |
| 4,094,076 A | 6/1978 | Baslow | |
| 4,174,822 A * | 11/1979 | Larsson | E03C 1/06 |
| | | | 248/75 |
| 4,225,106 A | 9/1980 | Eplan | |
| 4,292,748 A | 10/1981 | Miller | |
| 4,311,407 A | 1/1982 | Doyle | |
| 4,453,695 A | 6/1984 | Sennott | |
| 4,461,439 A * | 7/1984 | Rose | A45D 20/16 |
| | | | 248/288.31 |
| 4,673,148 A | 6/1987 | Oliver | |
| 4,696,447 A * | 9/1987 | Strecker | A45D 20/12 |
| | | | 248/206.3 |
| 4,712,313 A | 12/1987 | Gettleman | |
| 4,746,090 A * | 5/1988 | Hamilton | A45D 20/12 |
| | | | 248/314 |
| 5,174,531 A | 12/1992 | Perakis | |
| 5,220,697 A * | 6/1993 | Birchfield | A47K 3/281 |
| | | | 4/559 |
| 5,350,144 A | 9/1994 | Lary | |
| 5,470,037 A | 11/1995 | Willis | |
| 5,481,765 A * | 1/1996 | Wang | A47K 3/28 |
| | | | 4/567 |
| 5,613,305 A * | 3/1997 | Narrin | A45D 20/12 |
| | | | 34/90 |
| 5,630,517 A | 5/1997 | Maznik | |
| 5,632,049 A * | 5/1997 | Chen | E03C 1/06 |
| | | | 248/124.2 |
| 5,652,973 A * | 8/1997 | Blue | A47K 3/28 |
| | | | 248/229.26 |
| 5,761,825 A | 6/1998 | Ammon | |
| 5,832,624 A | 11/1998 | Narrin | |
| 5,833,192 A * | 11/1998 | Buhrman | E03C 1/06 |
| | | | 248/295.11 |
| 5,842,670 A | 12/1998 | Nigoghosian | |
| 5,937,537 A * | 8/1999 | Miller | A45D 20/12 |
| | | | 248/160 |
| 5,956,861 A | 9/1999 | Barnes | |
| 6,044,574 A | 4/2000 | Haghkhah | |
| 6,189,229 B1 | 2/2001 | Thomas | |
| 6,345,797 B1 * | 2/2002 | Ming-Hsiao | A47K 10/40 |
| | | | 211/105.1 |
| D456,657 S | 5/2002 | Mar | |
| 6,390,424 B1 * | 5/2002 | Kidushim | A45D 20/12 |
| | | | 248/122.1 |
| 6,430,759 B1 * | 8/2002 | Beltran | A47K 5/04 |
| | | | 211/105.1 |
| 6,453,486 B1 * | 9/2002 | Chen | E03C 1/06 |
| | | | 239/283 |
| 6,502,796 B1 * | 1/2003 | Wales | E03C 1/06 |
| | | | 248/230.1 |
| 6,601,813 B1 | 8/2003 | Kager | |
| 6,609,689 B1 * | 8/2003 | Knapp | A47K 5/04 |
| | | | 248/205.5 |
| 6,651,830 B2 * | 11/2003 | Pan | A47K 10/10 |
| | | | 211/105.1 |
| 6,671,896 B2 * | 1/2004 | Tse | E03C 1/06 |
| | | | 248/295.11 |
| 6,736,364 B2 | 5/2004 | Oddsen, Jr. | |
| 6,802,089 B2 * | 10/2004 | Cropelli | E03C 1/066 |
| | | | 248/297.31 |
| 6,802,484 B1 | 10/2004 | Kiley | |
| 6,997,421 B2 | 2/2006 | Reynolds | |
| 7,043,776 B1 * | 5/2006 | Wu | E03C 1/0408 |
| | | | 4/601 |
| 7,197,776 B2 * | 4/2007 | Tsai | E03C 1/06 |
| | | | 248/230.1 |
| 7,407,140 B2 * | 8/2008 | Sen | E03C 1/066 |
| | | | 239/283 |
| 7,506,849 B1 | 3/2009 | Koster | |
| 7,721,363 B2 * | 5/2010 | Huang | E03C 1/066 |
| | | | 248/122.1 |
| 7,748,583 B1 | 7/2010 | Woltman | |
| 7,766,291 B2 * | 8/2010 | Eilmus | E03C 1/06 |
| | | | 248/222.11 |
| 8,103,155 B2 * | 1/2012 | Dannenberg | A45D 20/12 |
| | | | 392/379 |
| 8,132,766 B2 * | 3/2012 | Tooley | A47K 5/18 |
| | | | 248/205.5 |
| 8,141,719 B2 * | 3/2012 | Hopper | A47F 7/0028 |
| | | | 211/163 |
| 9,345,354 B2 * | 5/2016 | Nicolopulos | A47F 5/02 |
| 9,408,452 B1 | 8/2016 | Al-Khulaifi | |
| 9,578,994 B2 * | 2/2017 | Capp | B05B 1/185 |
| 9,587,385 B2 * | 3/2017 | Andersen | E03C 1/066 |
| D784,040 S * | 4/2017 | Herrero | D6/522 |
| 9,677,256 B2 * | 6/2017 | Wilson | E03C 1/0408 |
| 10,117,492 B2 | 11/2018 | Karbakhsh | |
| 10,123,636 B2 * | 11/2018 | Nicolopulos | A47F 5/02 |
| 10,245,610 B2 * | 4/2019 | Johnson | B05B 1/1645 |
| 10,281,083 B2 * | 5/2019 | Bacallao | G06F 1/1632 |
| 10,352,025 B2 * | 7/2019 | Culmer | E03C 1/066 |
| 10,422,113 B2 * | 9/2019 | Wilson | F16K 11/085 |
| 10,520,131 B2 * | 12/2019 | Burke | F16M 11/10 |
| 2005/0193487 A1 * | 9/2005 | Watari | E03C 1/066 |
| | | | 4/570 |
| 2008/0185353 A1 * | 8/2008 | Immerman | A47K 10/04 |
| | | | 211/16 |
| 2009/0308998 A1 * | 12/2009 | Felmeri | E03C 1/06 |
| | | | 248/295.11 |
| 2010/0170862 A1 * | 7/2010 | Poisson | A63D 15/10 |
| | | | 211/68 |
| 2014/0112791 A1 | 4/2014 | Abell | |
| 2015/0083886 A1 | 3/2015 | Brown et al. | |
| 2018/0094768 A1 * | 4/2018 | Burke | F16M 11/18 |
| 2020/0003359 A1 * | 1/2020 | Vlaar | F16M 11/08 |

OTHER PUBLICATIONS

360° Adjustable Hands Free Hair Dryer Wall Bathroom Mount Stand Holder With Suction Cup, https://www.walmart.com/ip/360-Adjustable-Hands-Free-Hair-Dryer-Wall-Bathroom-Mount-Stand-Holder-With-Suction-Cup/546188971.

Adjustable Height Hair Dryer Stand, https://www.arthritissupplies.com/adjustable-height-hair-dryer-stand.html.

Hands Free Hair Dryer Stand, https://www.arthritissupplies.com/hands-free-hair-dryer-stand.html.

Knifun Hair Dryer Holder with Suction Cup Hands Free 360 Degree Rotation Aluminum Alloy Hairdryer Stand for Men Nomen Kids Elder or Pet Hair Styling—Mounted at Any Smoothy Surface, Silver, https://www.walmart.com/ip/Knifun-Hair-Dryer-Holder-Suction-Cup-Hands-Free-360-Degree-Rotation-Aluminum-Alloy-Hairdryer-Stand-Men-Women-Kids-Elder-Pet-Hair-Styling-Mounted-Smoo/690570329.

Hands Free Hair Dryer Stand Holder—Blow Dryer Mount For Hands Free Drying—Blowdryer Stand Perfect For Any Counter—Attachment Makes Styling, Curling, Straightening & More Easy by 5 Star Super Deals, https://www.amazon.com/Hands-Free-Dryer-Stand-Holder/dp/B0748S4WBV.

Hands Free Hair Dryer Holder—Compact For Home And Travel! By JUMBL by Hair Dryer Holder Company, https://www.amazon.com/dp/B005IH0KDC/ref=psdc_11058141_t3_B0748S4WBV.

VaLaVie Hair Dryer Holder Wall Mount Self Adhesive Storage Organizer for Hair Blower with Plug Stand, 304 Stainless Steel Brushed Nickel & Water-Resistant, https://www.amazon.com/dp/B0739R3LCR/ref=psdc_11058141_t4_B005IH0KDC.

Hands Free Hair Dryer Holder by JUMBLby JUMBL, https://www.amazon.com/Hands-Free-Dryer-Holder-JUMBL/dp/B0082BQQV6.

Innelo Hair Dryer Holder, Hands Free Dryer Stand for Hair Styling and Storage by innelo, https://www.amazon.com/innelo-Dryer-Holder-Styling-Storage/dp/B07GRTCFG8.

(56) References Cited

OTHER PUBLICATIONS

CUTICATE Stainless Steel Hands Free Hair Dryer Holder with Sucker 360 Degree Rotation by CUTICATE, https://www.amazon.com/CUTICATE-Stainless-Holder-Sucker-Rotation/dp/B07KW1DBW1/.

\* cited by examiner

UNIVERSAL BATHROOM HOLDER

BACKGROUND OF THE INVENTION

Field of the Invention

The present invention relates generally to supporting devices. More particularly the present invention relates to a device to hold a hairdryer, mirror and other items in place as supported by a wall. These items may be adjustably positioned in a vertical and horizontal position, and may be pivoted as needed.

Description of Related Art

After showering or bathing, it is often desirable to quickly dry one's hair using a hairdryer. Hairdryers have been long used to direct air, often heated air, at a user's hair in order to quickly dry it. However, in many instances it can become cumbersome to dry one's hair, and at the same time hold it and style it using, for example, a brush. Each of these three activities (drying, holding, and styling) each require one hand, and a person is therefore limited to two of the three at a time without a helper. Moreover, given the rise of smartphones and tablets, it is often convenient to be able to use these devices while also drying ones hair.

Also, with the rise of more efficient and compact living arrangements, there is an increasing need for efficient storage solutions to make the most effective use of small spaces, especially bathrooms.

Therefore, what is needed is a hands-free hair dryer device which may be used for storage of other bathroom items instead of or in addition to holding the hair dryer.

SUMMARY OF THE INVENTION

The subject matter of this application may involve, in some cases, interrelated products, alternative solutions to a particular problem, and/or a plurality of different uses of a single system or article.

In one aspect, an item holder is provided. The item holder is formed of an elongate bar, with a slider slideably connected to the bar and movable, when in an unlocked mode, along a length of the bar. The slider can be locked or otherwise held in position when in a locked mode. The slider defines an aperture, and at least partially surrounds the bar at a distal end. The slider further has fingers defining a connector aperture at a proximal end. A holder is configured to receive an item connected thereto. The holder is connected to the slider by a peg fitted into the connector aperture, and is pivotable with respect to the slider.

In another aspect, an item holder assembly is provided. The item holder assembly is formed of an elongate bar which has two arms positioned along its length. These arms extend away from the bar and are connected to a wall. The item holder further has a slider slideably connected to the bar and movable, when in an unlocked mode, along a length of the bar. The slider can be locked or otherwise held in position when in a locked mode. The slider has an aperture at least partially surrounding the bar at a distal end, and fingers defining a connector aperture at a proximal end. A holder is configured to receive an item connected thereto, the holder is connected to the slider by a peg fitted into the connector aperture, and is pivotable with respect to the slider.

In yet another aspect, a hair dryer holder assembly is provided. The hair dryer holder assembly is formed of an elongate bar which has two arms positioned along its length. These arms extend away from the bar and are connected to a wall. The item holder further has a slider slideably connected to the bar and movable, when in an unlocked mode, along a length of the bar. The slider can be locked or otherwise held in position when in a locked mode. The slider has an aperture at least partially surrounding the bar at a distal end, and fingers defining a connector aperture at a proximal end. A hairdryer holder formed as a body having a peg at a distal end, with fingers at a proximal end defining a hairdryer opening. These fingers are spaced apart at the distal end allowing passage of an electrical cord of the hairdryer. The hair dryer holder is connected to the slider by the peg fitted into the connector aperture, the holder pivotable with respect to the slider. A hair dryer is removably positioned in the hairdryer opening, and held in place there.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

The present invention is a structure for holding a hair dryer or other item adjustably in position to allow a user to achieve hands-free use of the item. The item support is designed to make hair drying, and the use of any other items in a bathroom setting easier and more efficient. For example, in a hair dryer holder embodiment, there is a problem of when holding the hairdryer with one hand and a hairbrush with the other, one needs a third hand to manipulate their hair. The item holder of the present invention is formed of an approximately vertically mounted bar, with a slider slideably connected to the bar. The slider can be loosened, moved, and tightened into position. An item can then be connected to the slider, and held in place in a vertical position. For example, in a hair dryer embodiment, the hair dryer may be mounted to the holder, adjusted to an appropriate height, and then directed at a head or hair of a user. The slider, also referred to as a tool, has a base that has an opening which is the exact or slightly larger diameter and shape of the bar. The slider is also connectable, directly or indirectly, to the hair dryer to hold it in place.

In one embodiment, an adapter tool such as a peg or other protrusion or shape may be removably connected into a receiver structure on the slider shaped to accept the adapter tool. For example, the receiver may be an aperture, slot, or other recession or opening to receive the adapter tool. In another embodiment, a top end of the adapter tool flares out to allow a handle of most typical handheld hairdryers to fit therein. In a further embodiment, there is a slot in the top end of a hairdryer holder to allow the cord through. Once the hairdryer is held firmly in the adapter tool, it can be adjusted up, down, side to side and angled while drying and styling the hair with both hands free by adjusting the slider that the adapter tool is connected to. The components of the item holder of the present invention may be manufactured in a variety of metal finishes to coordinate with bath decor.

Figure 1:
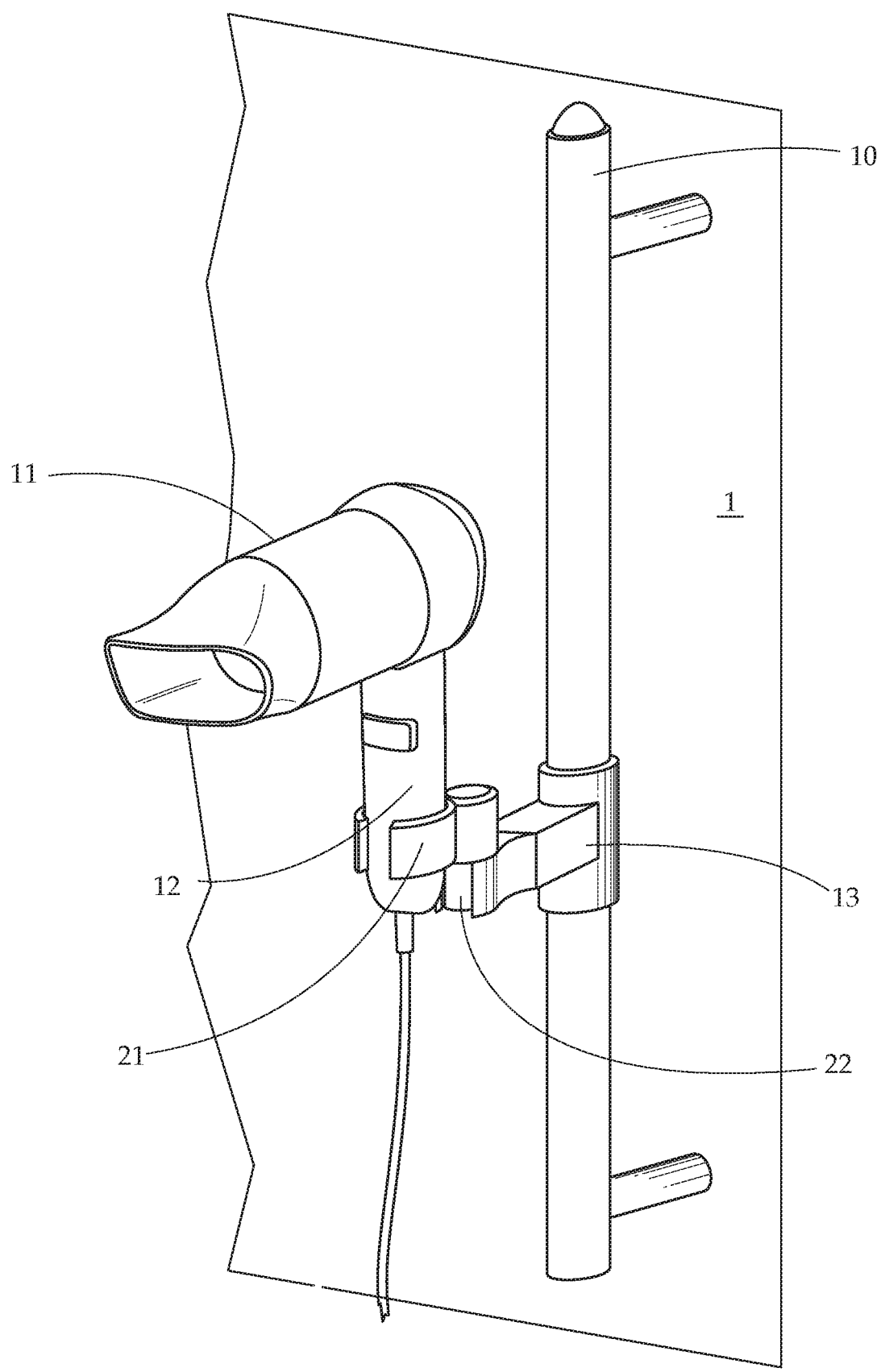
FIG. 1 provides a perspective view of an embodiment of the present invention.

One exemplary embodiment of the item holder of the present invention is shown in FIG. 1. Here, a vertical bar 10 is attached to wall 1. A slider 13 is slideably connected to the bar 10 and securable in place. In this view, slider 13 encompasses the bar 10. Though, in other embodiments, the slider may be removably connected to the bar. A holder 21 is configured to connect the hair dryer 11 to the slider 13. The holder has a connector formed as a peg 22 which has a diameter or shape sized to fit within the slider, or otherwise to connect to the slider 13. Once the hair dryer 11 is connected, such as by a hair dryer handle 12 being seated in the holder 21, the slider 13 can be locked in place, and the hair dryer may be used to direct an air flow in a continuous direction.

Figure 2:
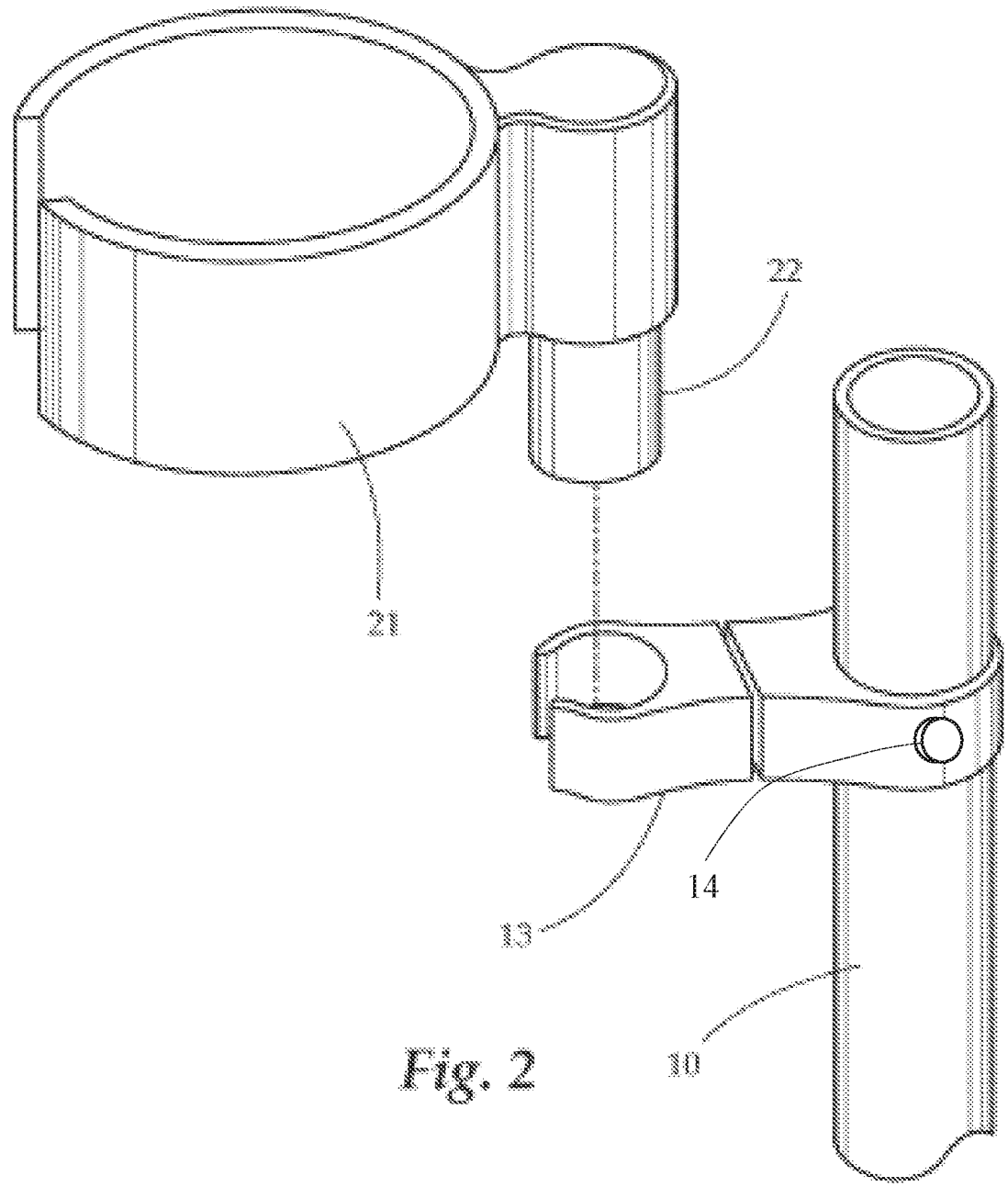
FIG. 2 provides a detail view of connector parts of the present invention.

FIG. 2 provides a detail view of an embodiment of the slider 13 which has a connector to receive the holder 21 via connector 22, shown here as a peg which can be received in an opening defined by the slider 13. It should be understood that the slider 13 may receive an item holder in any number of ways without straying from the scope of this invention. Similarly, other holder configurations may operate in a similar or different manner, to hold other items, and are still within the scope of this invention. However, the peg embodiment allows for secure, pivoting, and removable connection while being easy to manufacture and use. In some embodiments and as shown in FIG. 2, a screw 14 may be used to connect the slider to the bar and/or hold the slider in place. Screw 14 passes through slider 13 and is urged against the bar to provide fiction between the screw and the bar.

Figure 3:
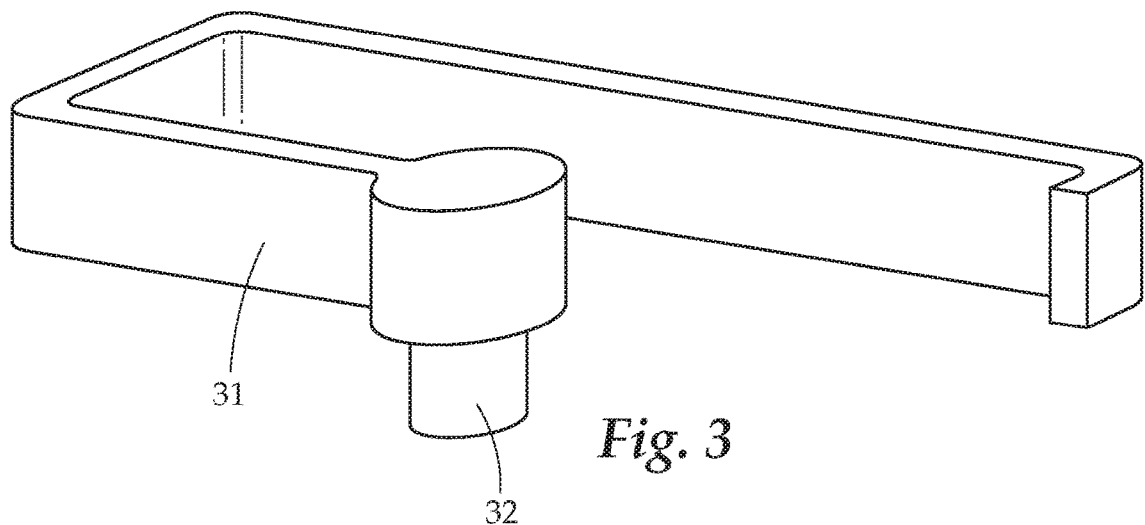
FIG. 3 provides a view of an embodiment of a towel or cloth holder of the present invention.
Figure 4:
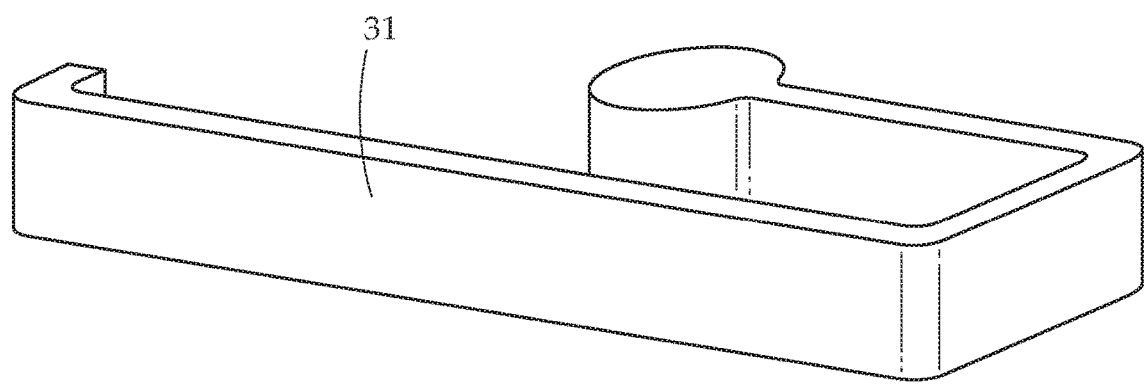
FIG. 4 provides a view of an embodiment of a towel or cloth holder of the present invention.
Figure 5:
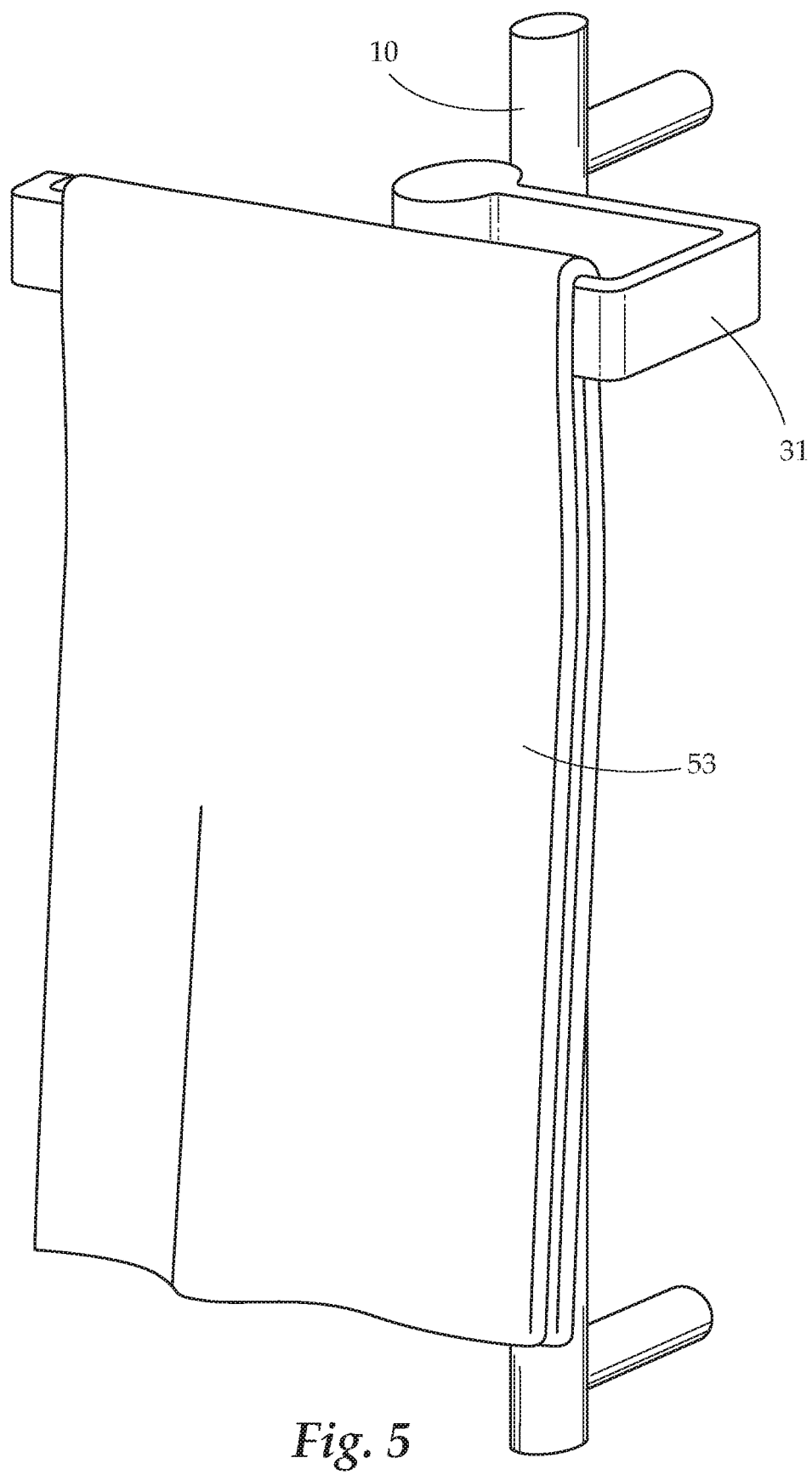
FIG. 5 provides a view of an embodiment of a towel or cloth holder of the present invention.

FIGS. 3-5 provide a view of an embodiment of the present invention formed as a towel or cloth holder (hereinafter "towel holder"). The towel holder 31 has a curved lengthwise shape which allows a towel 53 to be draped over a long portion and/or slid into position horizontally, while a hook portion at a distal end prevents unintentional sliding off of the towel 53. In some embodiments, the corners of the towel holder 31 have right angles at top to side transitions, which may prevent unintentional sliding off of the towel 53. Connector formed as a peg 32 of the holder 31 connects to the slider (not shown in this figure) in the same manner as shown in FIGS. 1 and 2. As noted above, slider can be moved up and down the vertical bar to adjust its height, which is the case in all of the embodiments shown in the figures (though is not necessarily required).

Figure 6:
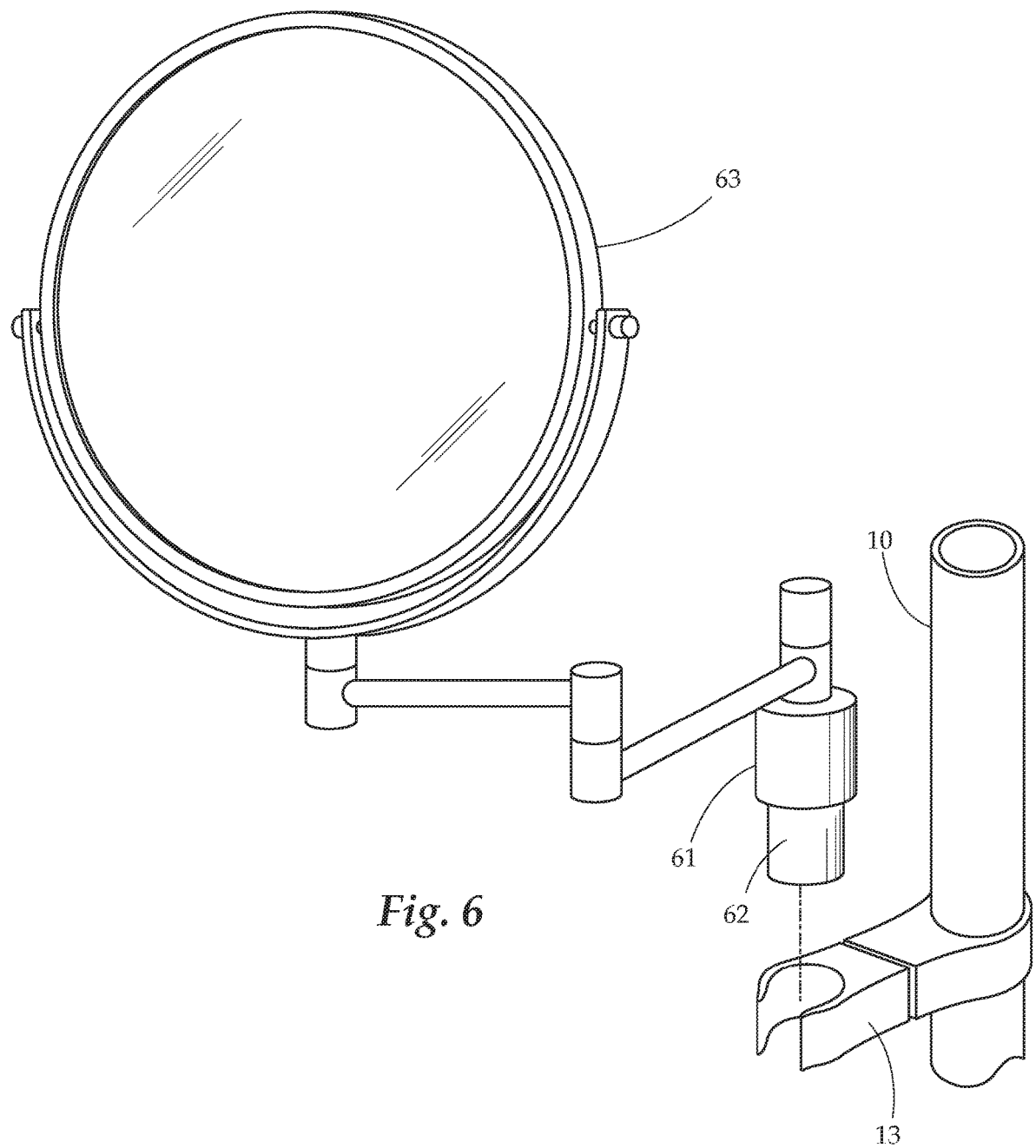
FIG. 6 provides a view of an embodiment of a mirror holder of the present invention.

FIG. 6 provides a view of an embodiment of the present invention being formed as a mirror holder. The mirror 63 is connectable to slider 13 which is slideable vertically along bar 10. A series of pivotable arms joins the mirror 63 to mirror connector 61, which has a peg 62 sized to fit within the slider 13 slot forming a mirror assembly.

Figure 7:
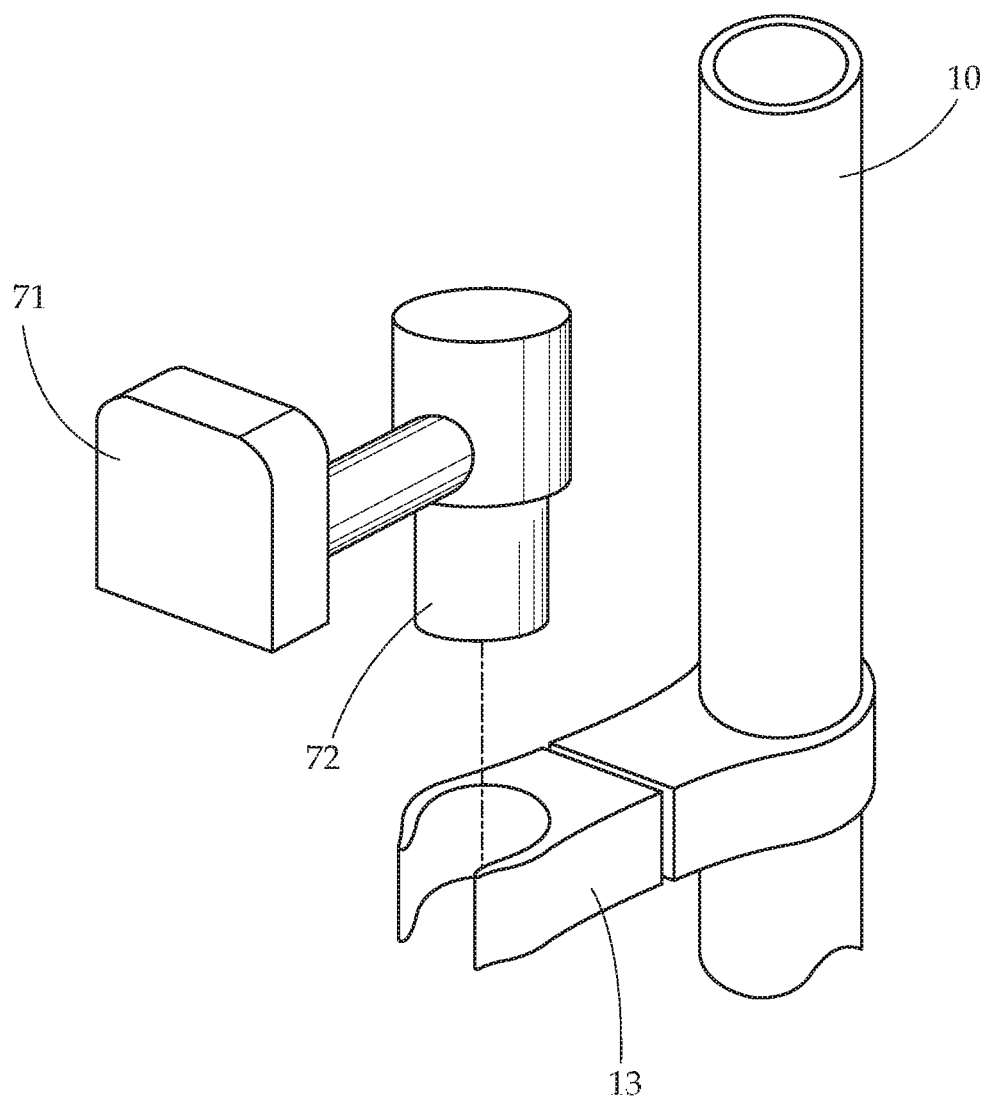
FIG. 7 provides a view of another embodiment of the invention formed as a bathrobe holder, which may also be used as a towel or other clothing or cloth holder.
Figure 8:
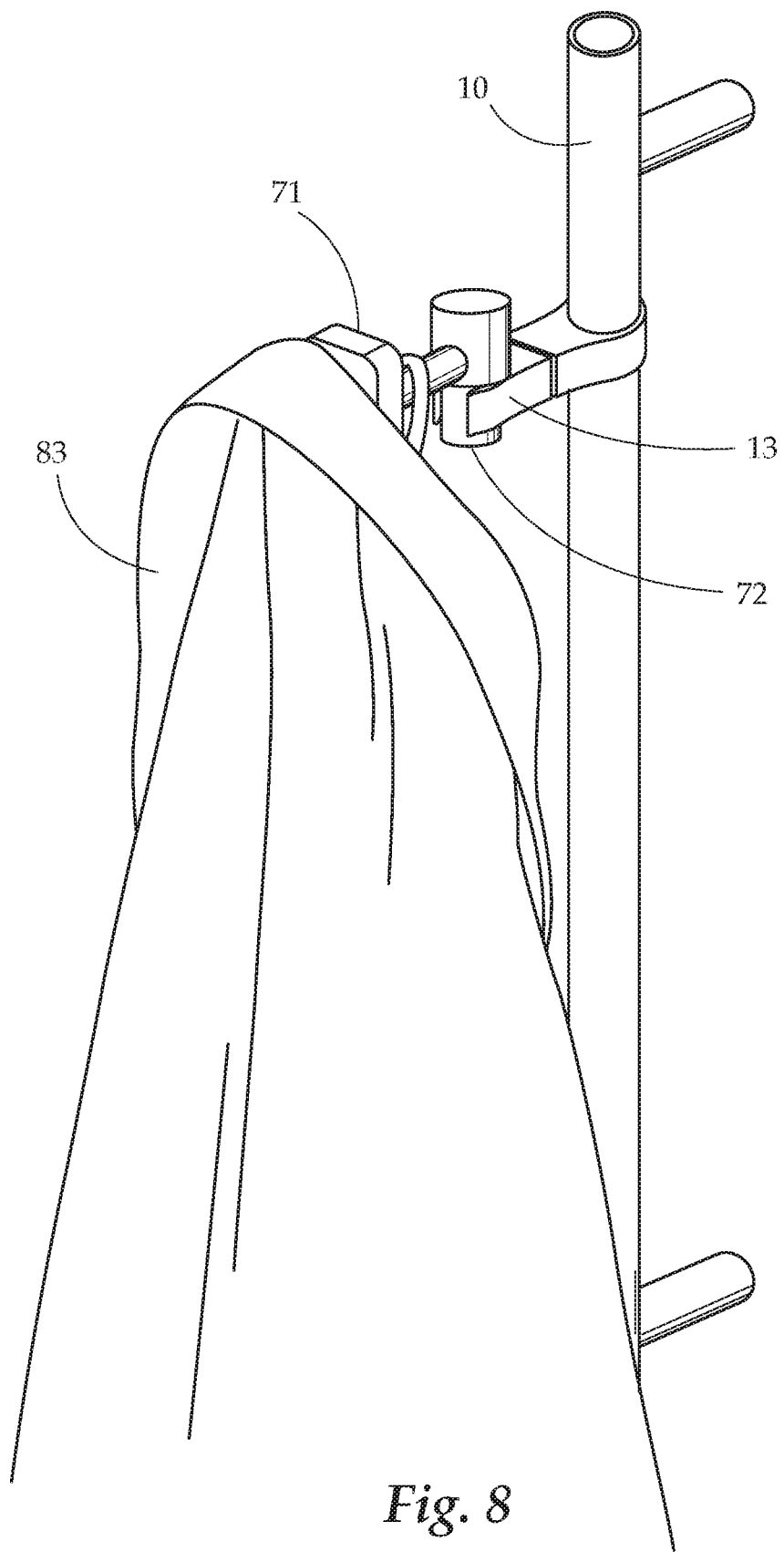
FIG. 8 provides a view of another embodiment of the invention formed as a bathrobe holder, which may also be used as a towel or other clothing or cloth holder.

FIGS. 7 and 8 provide a view of another embodiment of the present invention formed as a bathrobe holder, which may also be used as a towel or other clothing or cloth holder. In this view, a connector peg 72 is sized to fit within slider 13 slot. A hook 71 extends from a distal end of a bar opposite to the connector peg 72. A cloth such as a towel or the like may be draped over the hook 71, holding it in place.

Figure 9:
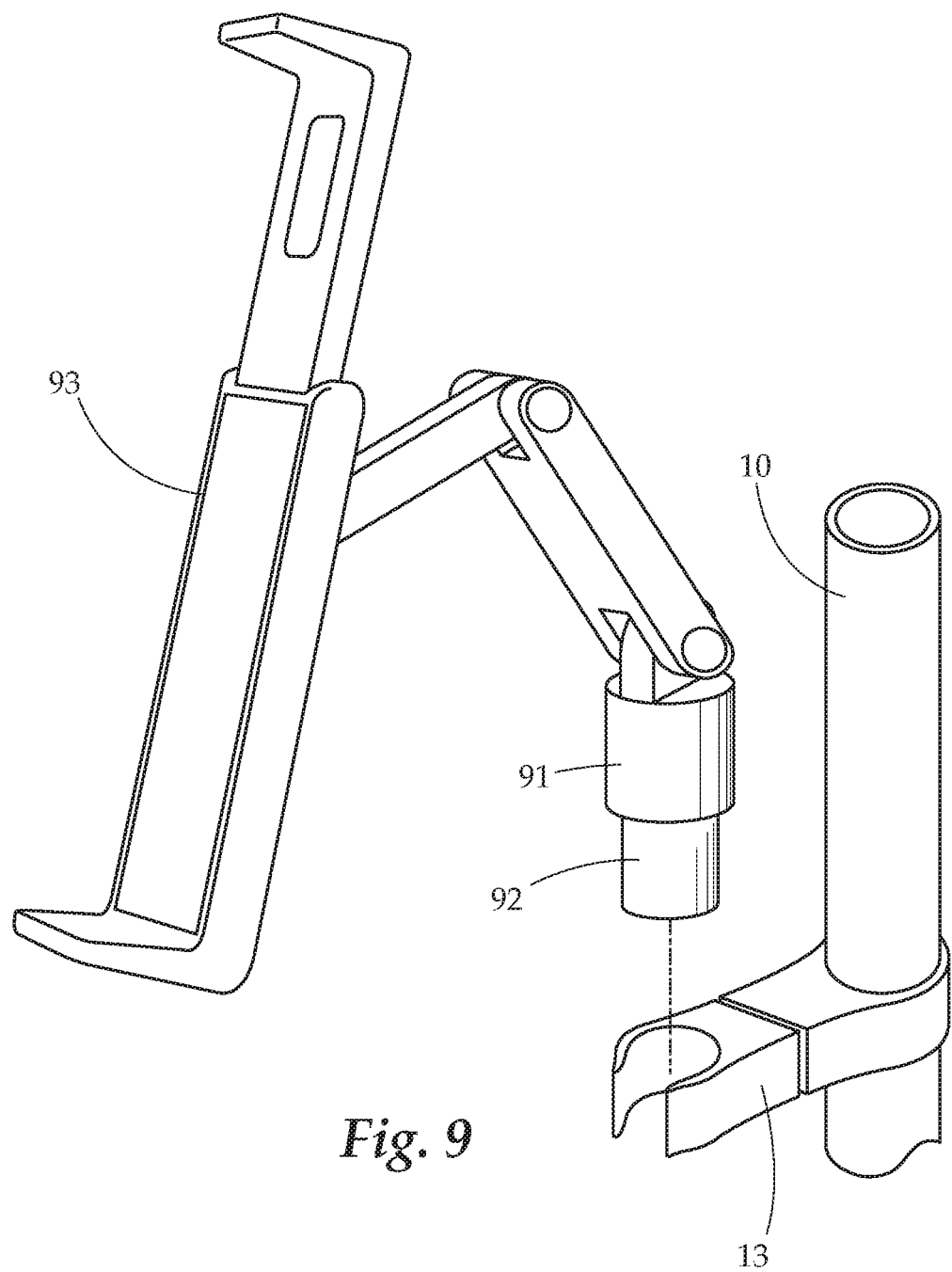
FIG. 9 provides a view of a computerized smartphone or tablet being held by an embodiment of the present invention.
Figure 10:
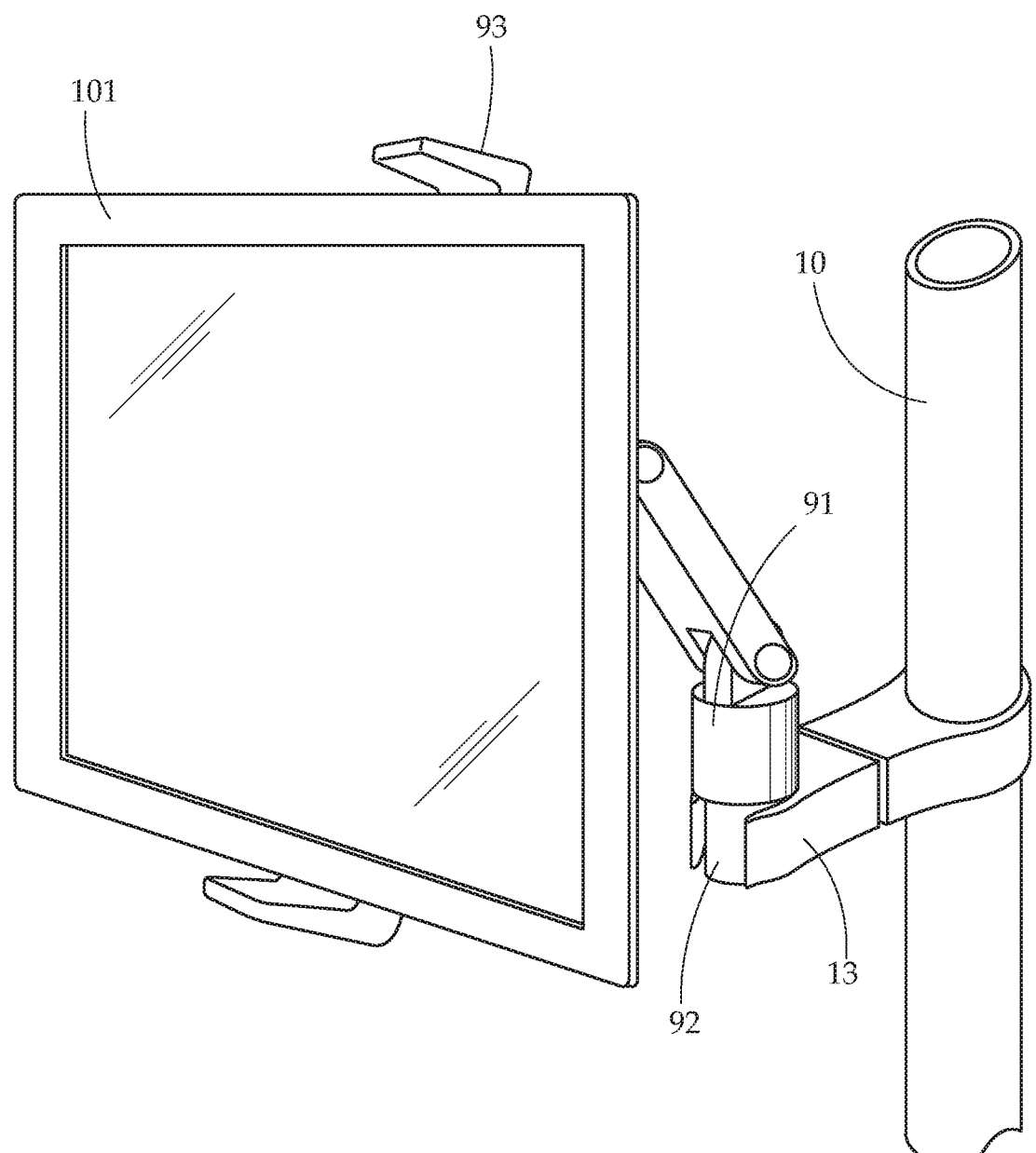
FIG. 10 provides a view of a computerized smartphone or tablet being held by an embodiment of the present invention.

FIGS. 9 and 10 provide a view of a computerized smartphone or tablet holder being held by an embodiment of the present invention. Indeed any display screen may be held by this embodiment. A screen holder 93 is capable of holding the tablet 101 (or the like) and can clamp downward on opposing edges, holding it in place (though any mechanism of holding the tablet is contemplated). A series of arms joins the screen holder 93 to a connector 91 forming an assembly, which has a peg 92 engagable with the slider 13 slot.

Figure 11:
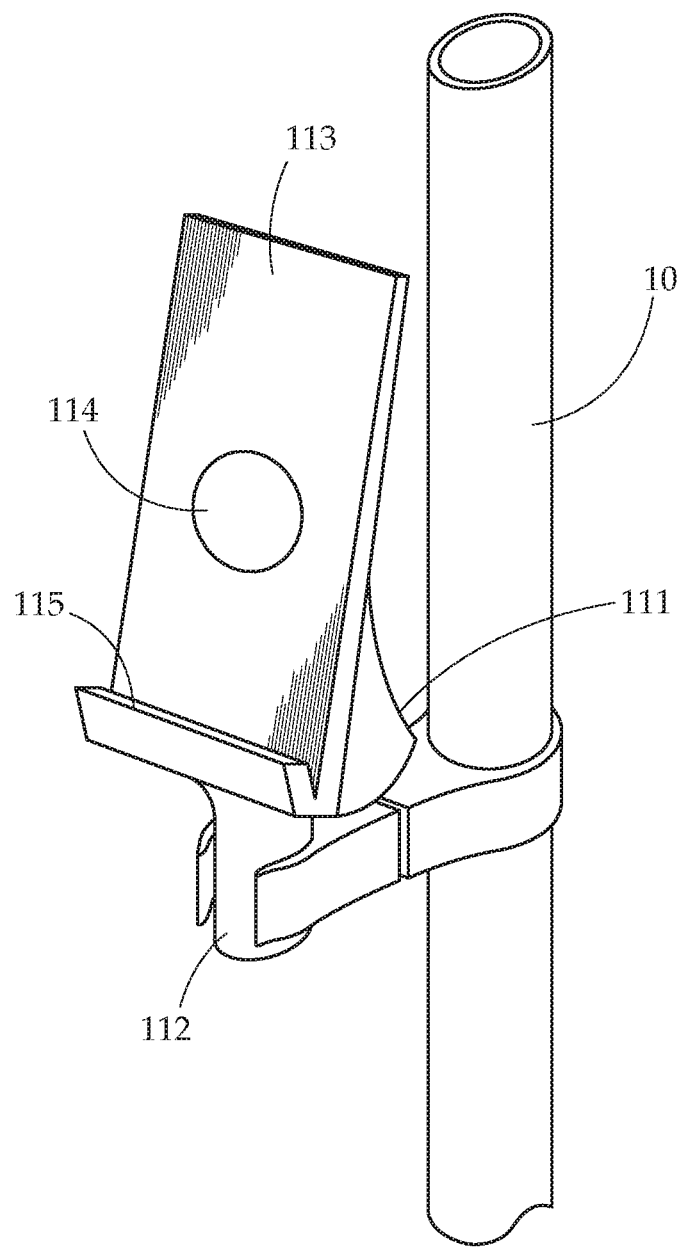
FIG. 11 provides a view of another embodiment of a computerized smartphone or tablet holder.

FIG. 11 provides a view of a holder for a computerized smartphone or tablet to be held by an embodiment of the present invention. Here, peg 112 is engagable with the slider slot. From the base 111 opposite to the peg 112 is an angled support face 113 on which a rear of the smartphone (or the like) rests. A ledge 115 extends from a bottom of the support face to provide a support surface on which the smartphone may rest against the force of gravity. A magnet 114 provides additional connective support by magnetically drawing the smartphone towards the support face 113.

In still another embodiment, not shown in the figures, a fan may be connected to the slider 13. This fan may be connected to the slider in any manner discussed herein, and may allow a user to direct an air flow at various directions and levels once connected. As understood from the foregoing, the item connectable to the vertical bar via the slider may be any varied number of items, without straying from the scope of the present invention. Connection of the slider to the bar to bring the slider between the unlocked and locked modes may be achieved by various structures, including clamps, snaps, engaging parts, thumb/wing screws acting as set screws, magnets, and the like.

In various embodiments, a plurality of sliders may be attached to the bar. Each slider may be operable to hold one of a plurality of different items. For example, there may be a slider holding a hair dryer holder, and on the same bar, there may be a slider holding a towel holder, and/or another slider holding a mirror holder. As such, the different embodiments of this invention may be used together on a single bar to serve a number of functions on a single bar installation.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An item holder comprising:
   an elongate bar;
   a slider slideably connected to the bar, the slider having an aperture at least partially surrounding the bar at a distal end, and fingers defining a connector aperture at a proximal end;
   a holder having a body that defines an opening configured to receive an item connected thereto, the holder further comprising a peg perpendicular to the opening, the peg configured to be received by the connector aperture, the holder connected to the slider by the peg fitted into the connector aperture, the holder pivotable along a plane perpendicular to the bar;

the holder further comprising a shoulder adjacent to the peg, the shoulder having a cross sectional area greater than a diameter of the peg, and having a cross sectional area greater than a cross sectional area of the connector aperture such that the shoulder cannot fit into or pass through the connector aperture;

wherein the peg of the holder is directly connected to the shoulder, and wherein the shoulder is directly connected to a portion of the body of the holder which defines the opening; and a hair dryer;

wherein the holder is a hair dryer holder, the hair dryer holder comprising the body having the peg at a distal end, with fingers at a proximal end of the body defining the hairdryer opening, the fingers being spaced apart at the proximal end allowing passage of an electrical cord of the hair dryer.

2. An item holder comprising:

an elongate bar;

a slider slideably connected to the bar, the slider having an aperture at least partially surrounding the bar at a distal end, and fingers defining a connector aperture at a proximal end;

a holder having a body that defines an opening configured to receive an item connected thereto, the holder further comprising a peg perpendicular to the opening, the peg configured to be received by the connector aperture, the holder connected to the slider by the peg fitted into the connector aperture, the holder pivotable along a plane perpendicular to the bar;

the holder further comprising a shoulder adjacent to the peg, the shoulder having a cross sectional area greater than a diameter of the peg, and having a cross sectional area greater than a cross sectional area of the connector aperture such that the shoulder cannot fit into or pass through the connector aperture;

wherein the peg of the holder is directly connected to the shoulder, and wherein the shoulder is directly connected to a portion of the body of the holder which defines the opening;

wherein the holder is a towel holder, the towel holder being formed as an elongate body having the peg at a distal end, and having the body formed in a series of bends in a length, and having a shape adapted to receive a towel;

wherein the series of bends in the length of the body define a J shape.

3. An item holder comprising:

an elongate bar;

a slider slideably connected to the bar, the slider having an aperture at least partially surrounding the bar at a distal end, and fingers defining a connector aperture at a proximal end;

a holder having a body that defines an opening configured to receive an item connected thereto, the holder further comprising a peg perpendicular to the opening, the peg configured to be received by the connector aperture, the holder connected to the slider by the peg fitted into the connector aperture, the holder pivotable along a plane perpendicular to the bar;

the holder further comprising a shoulder adjacent to the peg, the shoulder having a cross sectional area greater than a diameter of the peg, and having a cross sectional area greater than a cross sectional area of the connector aperture such that the shoulder cannot fit into or pass through the connector aperture;

wherein the peg of the holder is directly connected to the shoulder, and wherein the shoulder is directly connected to a portion of the body of the holder which defines the opening; and wherein the holder is a mirror holder, and the body further comprising a mirror assembly having an elongate arm and the peg at a distal end of the elongate arm of the body, the mirror assembly having a mirror at a proximal end of the elongate arm.

4. A hair dryer holder assembly comprising:

an item holder, the item holder comprising:

an elongate bar;

a slider slideably connected to the bar, the slider having an aperture at least partially surrounding the bar at a distal end, and fingers defining a connector aperture at a proximal end;

a hair dryer holder, the hair dryer holder comprising a body having a peg at a distal end, with fingers at a proximal end defining a hair dryer opening, the fingers being spaced apart at the proximal end allowing passage of an electrical cord of the hair dryer, the holder connected to the slider by the peg, where the peg is perpendicular to the hair dryer opening and configured to be received by the connector aperture, the hair dryer holder pivotable along a plane perpendicular to the bar;

the hair dryer holder further comprising a shoulder adjacent to the peg, the shoulder having a cross sectional area greater than a diameter of the peg, and having a cross sectional area greater than a cross sectional area of the connector aperture such that the shoulder cannot fit into or pass through the connector aperture;

wherein the peg of the hair dryer holder is directly connected to the shoulder, and wherein the shoulder is directly connected to a portion of the body of the hair dryer holder which defines the opening;

the item holder connected to a wall by the two arms of the elongate bar connecting to the wall; and a hair dryer removably connected to the hair dryer holder by being seated in the hair dryer holder with a part of the hair dryer passing through the hair dryer opening, and another part of the hair dryer resting on the fingers.

* * * * *